United States Patent [19]
Yaski

[11] Patent Number: 5,988,447
[45] Date of Patent: Nov. 23, 1999

[54] ADJUSTABLE MEASURING POUR SPOUT

[76] Inventor: Jud Yaski, P.O. Box 2011, South San Francisco, Calif. 94083

[21] Appl. No.: 09/070,674

[22] Filed: Apr. 30, 1998

[51] Int. Cl.[6] .............................. B67D 5/38; B67D 3/00; G01F 11/10

[52] U.S. Cl. ...................... 222/158; 222/364; 222/438; 222/535

[58] Field of Search .................................. 222/158, 282, 222/284, 305, 362, 363, 364, 424.5, 456, 434, 438, 535

[56] References Cited

U.S. PATENT DOCUMENTS

| | | | |
|---|---|---|---|
| 2,899,115 | 6/1959 | Matter | 222/438 |
| 3,456,852 | 7/1969 | Linn | 222/438 |
| 3,921,862 | 11/1975 | Holmstrom | 222/438 |
| 4,144,989 | 3/1979 | Joy | 222/438 |
| 4,637,529 | 1/1987 | Knight | 222/452 |
| 5,002,208 | 3/1991 | Towery | 222/438 |
| 5,667,106 | 9/1997 | Robbins, III | 222/158 |
| 5,791,528 | 8/1998 | Robbins, III et al. | 222/364 |

*Primary Examiner*—Andres Kashnikow
*Assistant Examiner*—Keats Quinalty
*Attorney, Agent, or Firm*—J. William Wigert, Jr.; Crosby, Heafey, Roach & May

[57] ABSTRACT

A measuring spout for installation on a container that dispenses particulate material. One embodiment of the spout measures and dispenses variable amounts of particulate material. Another embodiment of the spout measures and dispenses a fixed amount of particulate material. The spout comprises a wedge-shaped spout member that pivots through an opening formed in a wall of the container. The opening in the container has a gate which, in the preferred embodiment, acts as the back wall to the spout, separating the particulate material in the spout from the particulate material remaining in the container. Thus, as the spout opens, the front wall moves further away from the back wall, thereby, providing a variably sized chamber depending on how far the spout is opened from the container wall. The particulate material is measured by tilting the container so as to let the contents fill the spout. The particulate material is dispensed by returning the container to its upright position so the particulate material in the spout flows through an opening formed in the spout.

27 Claims, 12 Drawing Sheets

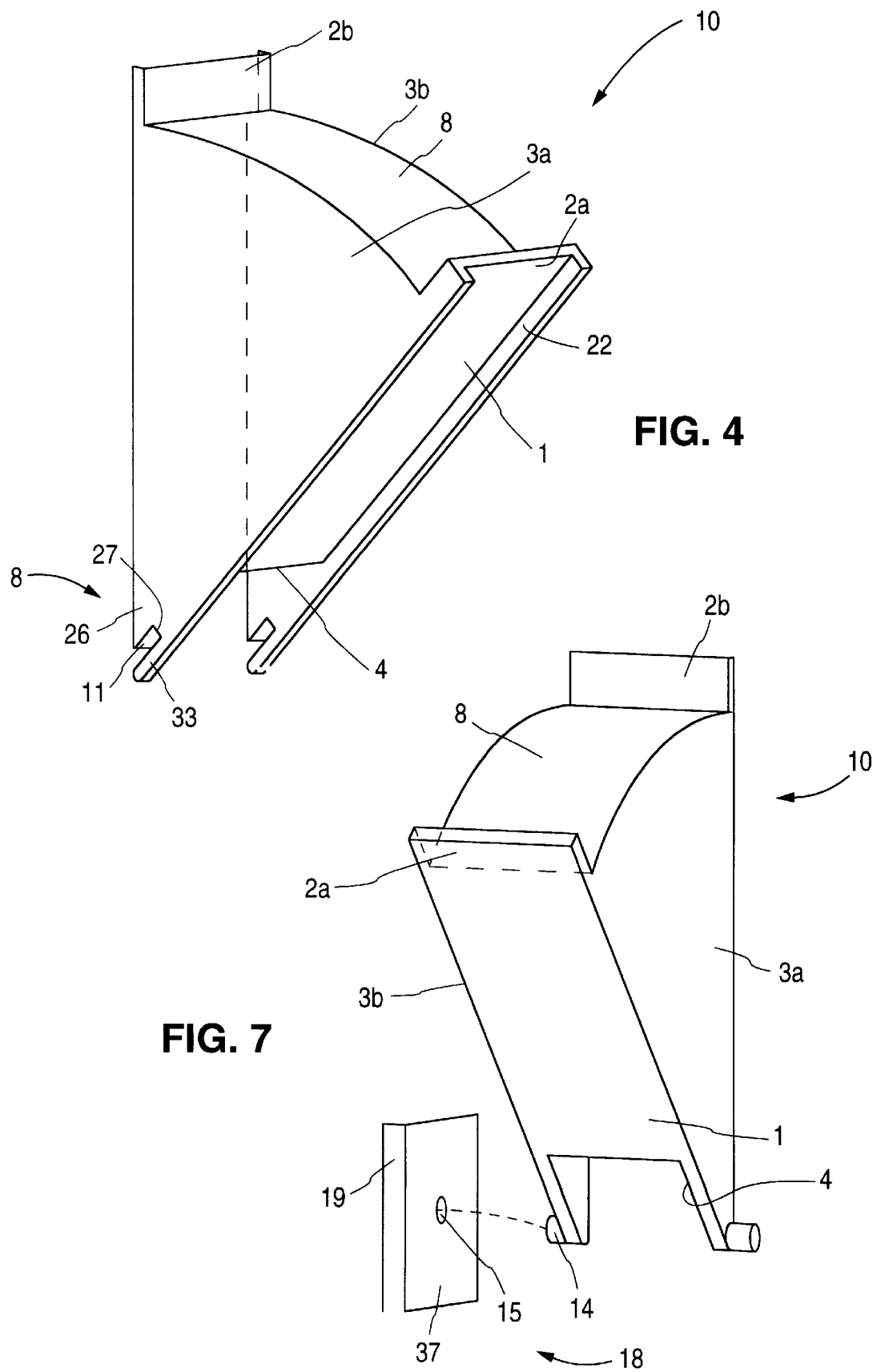

ADJUSTABLE MEASURING POUR SPOUT

FIELD OF THE INVENTION

The present invention relates to the measuring and dispensing of particulate materials and, more particularly, to an improved dispenser that allows a user to dispense variable amounts of particulate.

BACKGROUND OF THE INVENTION

Many particulate materials such as powdered detergent, powdered bleach, and other industrial products are used in measured amounts. For example, a measured quantity of powdered detergent is often used when washing clothing. To access the powdered detergent, a user opens a powdered detergent box and digs his hands through the caustic detergent to locate a scoop for dispensing the detergent. This approach has several drawbacks. First, the user's skin is exposed to the caustic detergent. Second, a powdered detergent box typically can't be resealed after it is opened. As a result, clumps of detergent may begin to form due to the detergent's exposure to the surrounding environment. Therefore, there is a continuing need for a dispenser that permits a particulate material container to be resealed after use and prevents a user from being exposed to the particulate material while the particulate material is being measured and dispensed.

Another drawback encountered in the prior art is that some particulate materials that should be used in measured amounts are not accompanied by a precise measuring device. For example, different sized pets require different quantities of pet food. However, conventional pet food containers either have no measuring and dispensing device (the food being dispensed from an opening in the food container) or a generic "one size" dispensing device (such as a scoop). This leads to a number of drawbacks. First, the pet food is exposed to the surrounding environment if the food is being dispensed through an aperture torn, cut, or otherwise permanently made in a surface of the container. Second, the pet may be overfed or underfed depending on the relationship between the size of the pet and the size of the generic scoop.

A few inventions have attempted to overcome the drawbacks encountered in the prior art. U.S. Pat. No. 3,921,862 to Holmstrom is directed to a measuring pour spout for installation on a detergent carton or box. Although the Holmstrom spout reduces the likelihood that a user will be exposed to the material within the carton or box, the Holmstrom spout has a number of limitations. First, the Holmstrom spout relies on a plastic frame and more than one moving part to allow a user to adjust the quantity of the detergent that is measured and dispensed. These features make the Holmstrom spout far too expensive to replace the current laundry detergent scoops now included in detergent cartons or boxes. Second, the Holmstrom spout is filled with detergent while the spout is positioned within the detergent carton or box. Therefore, a user cannot see when the Holmstrom spout is filled with a measured quantity of detergent. As a result, a user may dispense detergent using the Holmstrom spout before the spout is completely filled with the correct amount of detergent. Third, there are at least five steps required for measuring and dispensing detergent using the Holmstrom spout. This represents no significant reduction in time or work over the conventional measuring and dispensing processes discussed above. Therefore, a user is unlikely to use the Holmstrom spout for the few benefits it provides.

U.S. Pat. No. 4,637,529 to Knight is directed to a measuring dispenser for particulate material. Although the Knight dispenser is simpler and cheaper to mass produce than the Holmstrom spout, the Knight dispenser also has a number of limitations. First, the Knight dispenser does not permit a user to adjust the measured amount of detergent to be dispensed. This is a significant limitation since a user will often desire to adjust the amount of detergent being dispensed. For example, a user will want to measure and dispense a smaller amount of detergent for a light load of laundry than the user would want to measure and dispense for a heavy load of laundry. Second, the Knight dispenser, like the Holmstrom spout, also fills with detergent while the dispenser is positioned within the detergent carton or box. Therefore, a user cannot see when the Knight dispenser is filled with a measured quantity of detergent. As a result, a user may dispense detergent using the Knight dispenser before the dispenser is completely filled with the correct amount of detergent. Third, a closure panel or gate is used in the Knight dispenser to stop the dispenser from overfilling after the dispenser has been filled with a measured quantity of detergent. However, the closure gate may not always close properly since the gate is designed to close while the detergent is filling the dispenser. In other words, the flow of the particulate detergent may impede the closure of the gate after the dispenser has been filled with a selected quantity of detergent.

U.S. Pat. No. 4,144,989 to Joy, and U.S. Pat. No. 5,002,208 to Towery, are directed to dispensers for measuring and dispensing particulate material. However, these dispensers suffer from the limitations discussed above and are complex devices that are not cost effective. More particularly, the dispensers cannot be incorporated into a particulate container production line inexpensively enough to compete with the conventional scoops provided in the particulate containers of the prior art.

SUMMARY OF THE INVENTION

Briefly stated, a measuring spout is provided for installation on a container that dispenses particulate material. One embodiment of the spout measures and dispenses variable amounts of particulate material. Another embodiment of the spout measures and dispenses a fixed amount of particulate material. The spout comprises a wedge-shaped spout member that pivots through an opening formed in a wall of the container. The opening in the container has a gate which, in the preferred embodiment, acts as the back wall to the spout, separating the particulate material in the spout from the particulate material remaining in the container. Thus, as the spout opens, the front wall moves further away from the back wall, thereby, providing a variably sized chamber depending on how far the spout is opened from the container wall. The particulate material is measured by tilting the container so as to let the contents fill the spout. The particulate material is dispensed by returning the container to its upright position so the particulate material in the spout flows through an opening formed in the spout.

A feature of the present invention includes a measuring pour spout assembly including a container for holding a quantity of particulate material, the container including a first wall having an opening therethrough, a measuring pour spout having a top wall, a pair of side walls, and a front wall having an aperture extending therethrough, the top, side and front walls forming a chamber therebetween for collecting a quantity of particulate material dispensed from the opening of the container, the aperture for dispensing the collected quantity of particulate material from the chamber; and a mounting mechanism pivotally connecting the measuring pour spout in the opening of the first wall such that a volume of the chamber varies as the front wall of the spout is moved relative to the first wall of the container.

Another feature of the present invention includes a measuring pour spout assembly comprising a container for holding a quantity of particulate material, the container including a first wall having an opening and a pair of slots positioned below the opening, the opening and slots defining a cantilevered gate member, a measuring pour spout having a top wall, a pair of side walls, and a front wall having an aperture extending therethrough, the top, side and front walls forming a chamber therebetween for collecting a quantity of particulate material dispensed through the opening of the container, the aperture for dispensing the collected quantity of particulate material from the chamber, and a mounting mechanism pivotally connecting the measuring pour spout to the first wall such that the side walls of the spout slidably engage the grooves in the first wall, the chamber of the spout collects particulate material dispensed through the opening of the first wall, and a volume of the chamber varies as the front wall of the spout is moved relative to the cantilevered gate member.

A further feature of the present invention includes a measuring pour spout assembly comprising a container for holding a quantity of particulate material, the container including a first wall having an opening and a pair of slots positioned below the opening, the opening and slots defining a cantilevered gate member, a measuring pour spout having a top wall, a pair of side walls, and a front wall having an aperture extending therethrough, the top, side and front walls forming a chamber therebetween for collecting a quantity of particulate material dispensed through the opening of the container, the aperture for dispensing the collected quantity of particulate material from the chamber, and a mounting mechanism pivotally connecting the measuring pour spout to the first wall such that the side walls of the spout slidably engage the grooves of the container, a volume of the chamber varies when the front wall of the spout is moved relative to the cantilevered gate member, the chamber of the spout collects a measured quantity of particulate material dispensed through the opening of the container when the container is tipped from an upright position, and the aperture of the spout dispenses the measured quantity of particulate material when the container is returned to the upright position.

As used herein, "particulate material" includes dry or granular ingredients such as dry cat food, cereals, sugar, rice, or soap powders.

OBJECTS OF THE INVENTION

It is an object of the present invention to provide an adjustable measuring pour spout which overcomes the drawbacks of the prior art described above.

It is another object of the present invention to provide a pouring spout which can pre-measure variable amounts of the carton's contents thereby saving time and work by obviating the need of a separate measuring cup.

It is yet another object of the present invention to provide a pouring spout which can seal a container when the container is not in use, thereby, avoiding spills due to non-resealable apertures.

It is still another object of the present invention to provide a measuring pour spout which may be incorporated into disposable particulate containers, or added to after-market, reusable particulate material containers.

It is a further object of the present invention to provide a measuring pour spout that can be made cheaply enough to compete with conventional scoops included in particulate material containers and be cost effective enough to incorporate into markets where no scoops are packaged with particulate matter containers.

It is yet a further object of the present invention to provide a measuring pour spout mounted on the outside of a container to provide easy viewing of contents of the spout as the spout is being filled.

It is still a further object of the invention to provide a process for measuring and dispensing particulate material using the measuring pour spout of the present invention.

These and other advantages of the present invention will become apparent to one skilled in the art in view of the figures and description of the figures given below.

BRIEF DESCRIPTION OF THE DRAWINGS

The aforementioned advantages of the invention, as well as additional advantages thereof, will be more fully understood as a result of a detailed description of the preferred embodiment when taken in conjunction with the accompanying drawings in which:

FIG. 4 is a perspective view of one embodiment of a hinge mechanism for the spout of the present invention.

FIG. 7 is an exploded perspective view of another alternative embodiment of a hinge mechanism for the spout of the present invention.

DETAILED DESCRIPTION OF THE PREFERRED EMBODIMENTS

Figure 1:
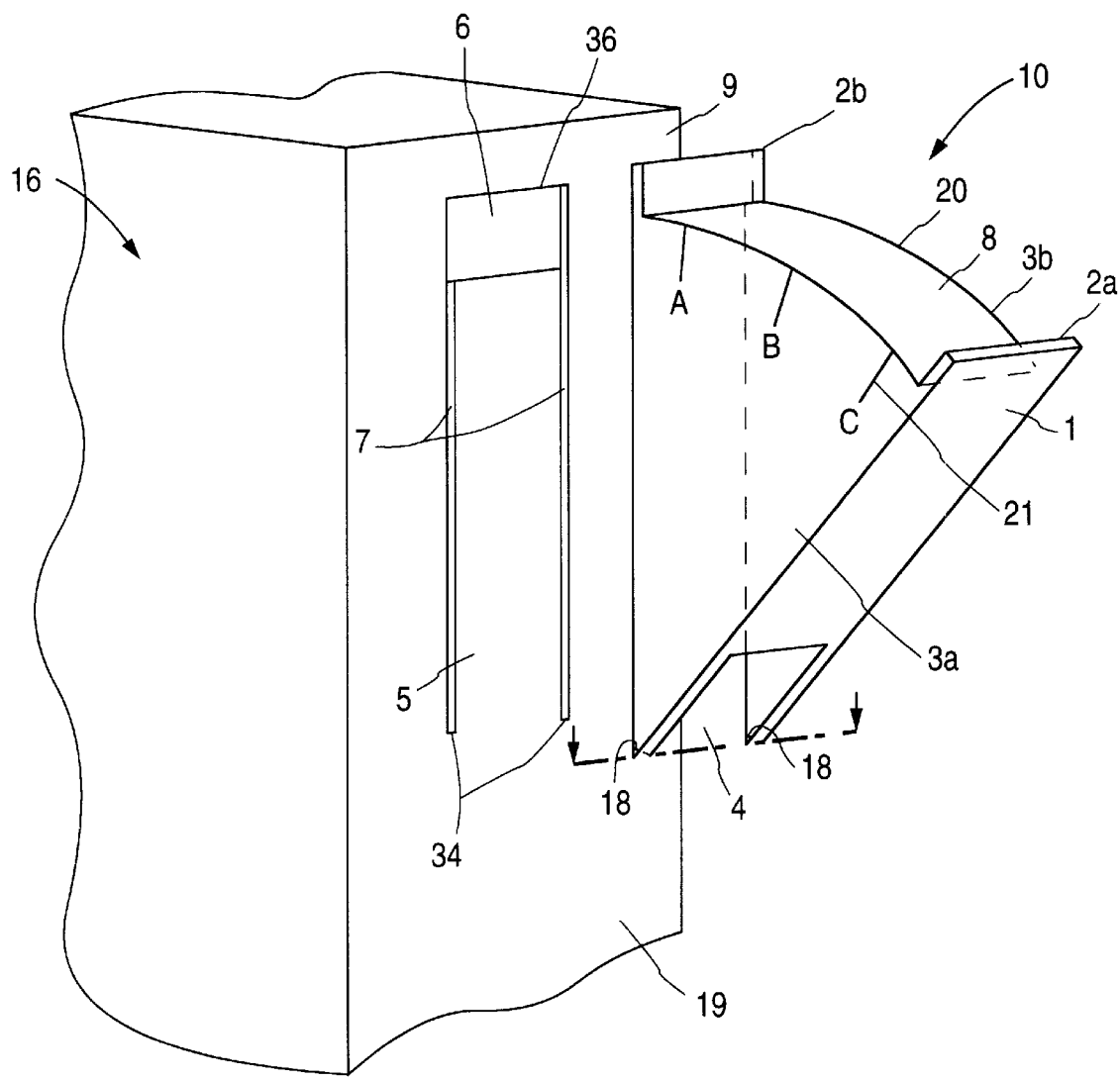
FIG. 1 is an exploded view of the adjustable measuring pour spout of the present invention.

Referring to FIG. 1, one embodiment of the measuring pour spout 10 is illustrated. The spout 10 is designed to be attached to a particulate material container 16 and may be fabricated from a rigid material such as plastic, metal, or glass. Generally, the particulate material container 16 includes a front wall 19 having a opening 16 and a pair of open-ended slots 7 extending therethrough. A portion of the front wall 19 forms a cantilevered barrier gate 5 positioned between the slots 7 and below the opening 6. The spout 10 is fitted to the barrier gate 5, as discussed in detail below.

The spout 10 includes two generally triangular side walls 3a and 3b having arcuate top edges 20, a front wall 1 having an opening 4 extending therethrough, and an arcuate top wall 8 extending between the arcuate edges 20 of side walls 3a and 3b. A front stop tab 2a and a rear stop tab 2b extend upwardly from opposing edges of the arcuate top wall 8. The spout 10 may have detents (not shown in FIG. 1) and corresponding graduated markings 21 along the arcuate edges 20 of side walls 3a and 3b to assist in measuring the amount of particulate material to be dispensed, as discussed in further detail below.

Figure 2A:
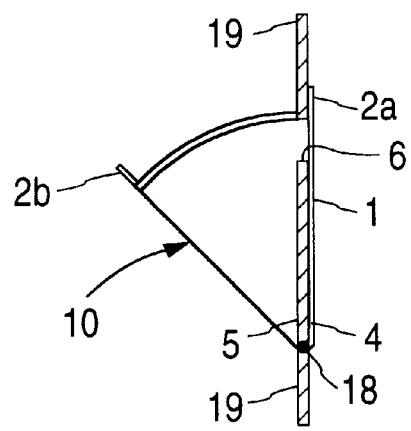
FIGS. 2A–2C are sectional views of the spout and the container wall illustrated in FIG. 1.
Figure 2B:
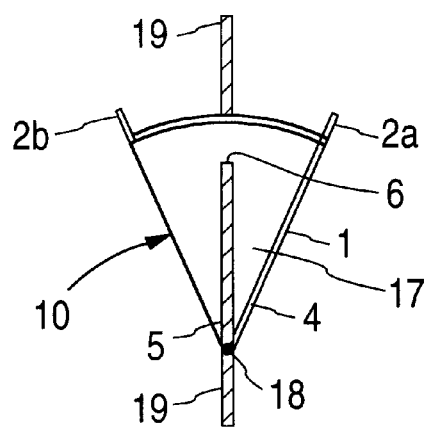
Figure 2C:
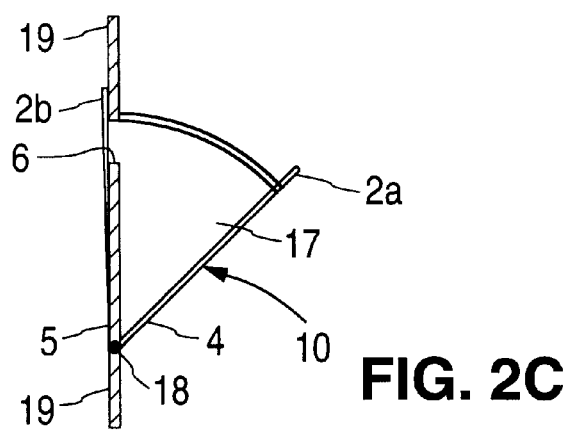

Referring to FIGS. 2A–2C, together with FIG. 1, the spout 10 is connected to the container 16 via a hinge mechanism 18 such that the side walls 3a and 3b of the spout 10 are positioned within the slots 7 on either side of the barrier gate 5 of the container 16. It should be noted, that the slots 7 are preferably wide enough to permit the side wall 3a and 3b to slide therethrough but narrow enough to prohibit any particulate material from passing therethrough. The hinge mechanism 18 supports the spout 10 on the container 16 such that the rear stop member 2b of the spout 10 is positioned inside the container 16 (left side of FIGS. 2A–2C) and the front stop member 2a is positioned on the outside of the container 16 (right side of FIGS. 2A–2C). With this arrangement, as shown in FIG. 2C, the rear stop member 2b engages an inner portion of the front wall 19 when the spout 10 is in the fully opened position, thereby, limiting the forward travel of the spout 10. Similarly, as shown in FIG. 2A, the front stop member 2a engages an outer portion of the front wall 19 when the spout 10 is in the fully closed positioned, thereby, sealing the container 16 and isolating the particulate material within the container 16 from the surrounding environment.

A cavity 17 is formed between the spout 10 and the container 16 as the spout is moved between the closed position (FIG. 2A) and the maximum open position (FIG. 2C). In particular, the sidewalls 3a and 3b, arcuate top wall 8, front wall 1, and gate 5 form the cavity 17. The user may vary the size of the cavity 17 by opening the spout 10 in accordance with the graduated markings 21 (shown in FIG. 1). For example, a user can form a medium-sized cavity (FIG. 2B) by opening the spout 10 until graduated marking "B" (see FIG. 1) is displayed. The user can also form a larger cavity (FIG. 2C) by opening spout 10 until graduated marking "C" (see FIG. 1) is displayed.

Figure 3A:
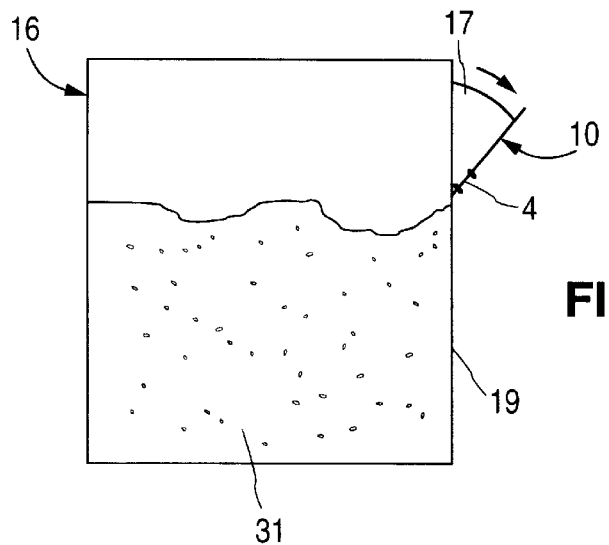
FIGS. 3A–3C are diagrammatic side elevational views of a process of measuring and dispensing particulate material using the spout of the present invention.
Figure 3B:
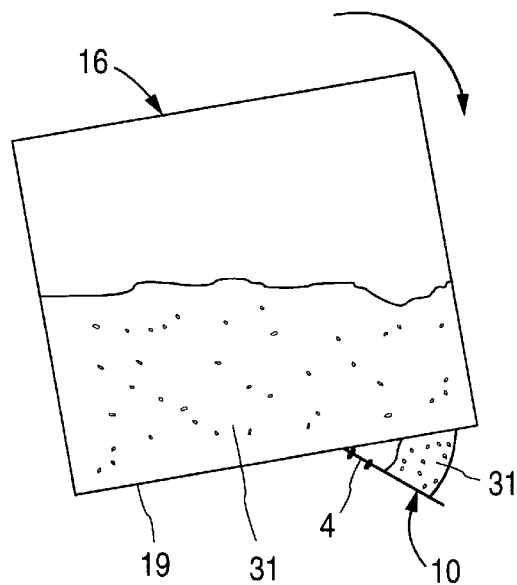
Figure 3C:
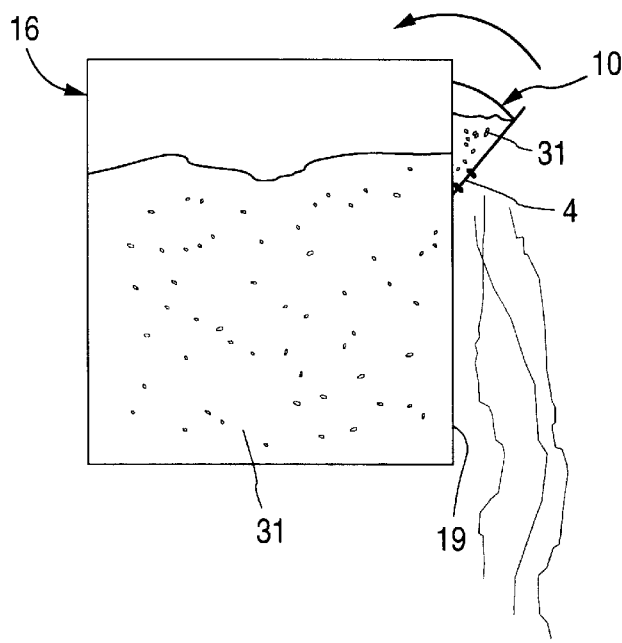

Referring now to FIGS. 3A–3C, in conjunction with FIG. 1, a method of dispensing particulate material using the measuring pour spout 10 of the present invention is shown. A user first slidably opens spout 10 by pulling front stop member 2a, as shown in FIG. 3A. As discussed above, the user may open the spout 10 to the desired volume, as defined by cavity 17, using the graduated markings 21. Turning now to FIG. 3B, the user then tilts the container 16 until the particulate material 31 fills the selected cavity 17. Preferably, the spout 10 is fabricated from a transparent or translucent material, such as plastic or glass, so a user may determine when the selected cavity 17 of the spout 10 is filled. Turning now to FIG. 3C, the user returns the container 16 to its original upright position once the spout 10 is filled with the selected or pre-measured amount of particulate material 31. This permits the particulate material 31 contained in the cavity 17 to pour out of the opening 4 of the spout 10. It should be noted that the particulate material 31 contained within the container 16 is prevented from exiting the opening 4 of spout 10 by the gate 5.

Referring now to FIG. 4, one embodiment of the hinge mechanism 18 is illustrated. In this embodiment, the hinge mechanism 18 includes two open-ended hinge slots 11. Each hinge slot 11 extends into one of the side walls 3a and 3b adjacent and parallel to the opening 4. The hinge slots 11 terminate at end points 27 and extend between projections 33 and 26 that are integral with the spout 10. This embodiment of the hinge mechanism 18 is preferably used when the spout 10 is installed in a disposable cardboard or plastic container.

Figure 5:
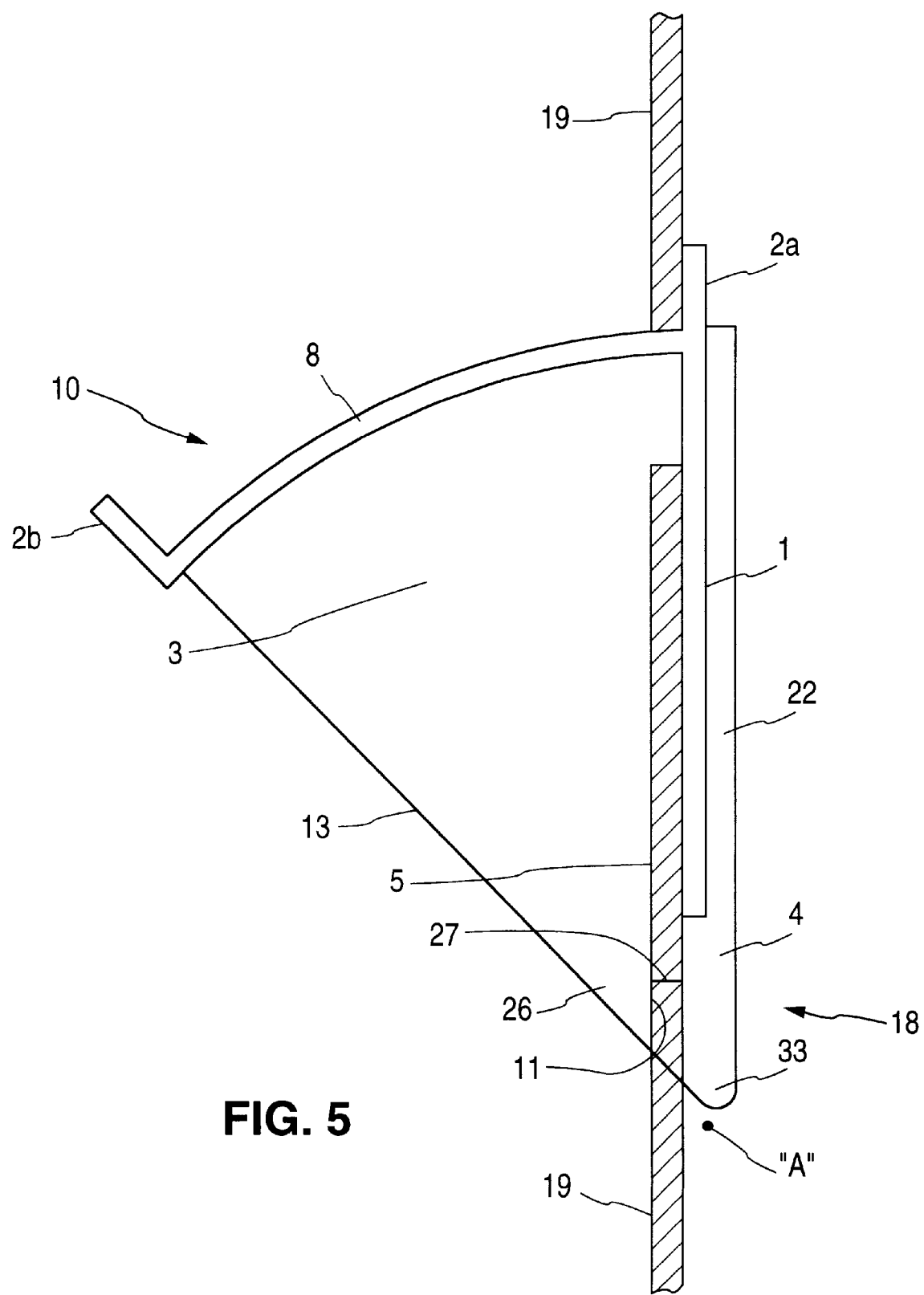
FIG. 5 is a side elevational view, partially in section, of the hinge mechanism of FIG. 4 interconnecting the container and the spout of the present invention.

Referring now to FIG. 5, in conjunction with FIG. 1 and FIG. 4, the engagement of the hinge mechanism 18 with the container 16 is illustrated. The hinge slots 11 of the hinge mechanism 18 engage the slots 7 of the container 16 such that the end points 27 of the hinge slots 11 are supported by the end points 34 of the slots 7. The top stop member 2a and projection 33 are positioned on the outside of the front container wall 19 (right side of FIG. 5). The rear stop tab 2b and the projection 26 are positioned on the inside of the front container wall 19 (left side of FIG. 5). The distance from the end points 27 of the hinge slots 11 to arcuate top wall 8 of the spout 10 is preferably the same as the distance from the end points 34 of the slots 7 to the upper edge 36 of the opening 9 of the container 16. This relationship ensures that the stop members 2a and 2b project beyond the upper edge 36 of the opening 9 which, in turn, ensures that the stop members 2a and 2b will limit the forward and backward movement of the spout 10 within the container 16.

Still referring to FIG. 5, when the spout 10 is in the closed position, the front panel 1 must be generally in the same plane as the axis of rotation "A" of the spout 10. One technique for achieving this is to recess the front panel 1 until it occupies the same plane as the axis of rotation "A" and to provide a ledge 22 that is as least the width of projection 33. Another technique for achieving this is to shift the hinge slots 11 until they occupy the same plane as front panel 1 and to thicken the front panel 1 until projection 33 is strong enough to support the spout 10 on the container 16. (Not shown).

In operation, the projection 33 is flush with the outside of the front container wall 19 when the spout 10 is in the closed position. As the spout is rotated from the closed position to an open position, the projection 33 presses against the outside of the front container wall 19. The front container wall 19 resiliently deflects towards the inside of the container (left side of FIG. 5) without being damaged by the projection 33.

Figure 6A:
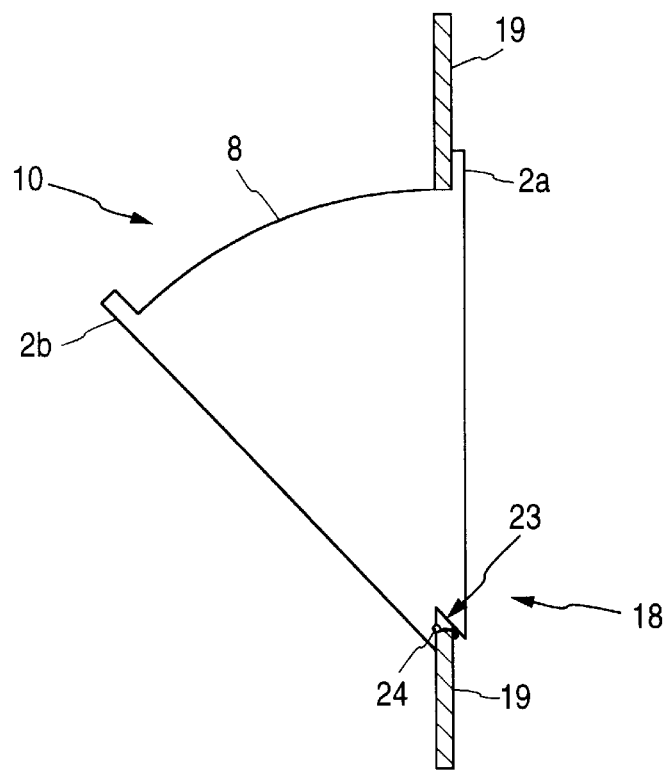
FIGS. 6A and 6B are side elevational views, partially in section, of an alternative embodiment of a hinge mechanism of the present invention.
Figure 6B:
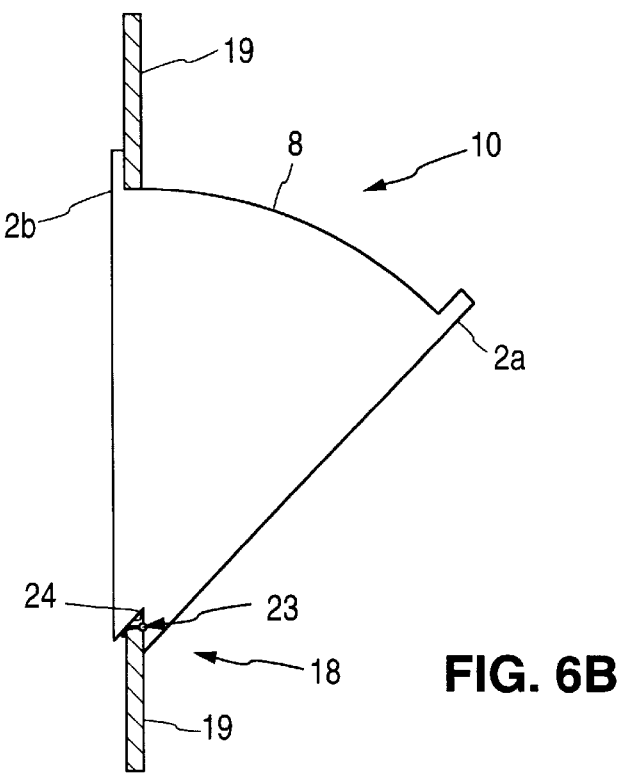

Referring now to FIGS. 6A and 6B, an alternative embodiment of the hinge mechanism is illustrated. In this embodiment, the hinge mechanism 18 includes angled hinge slots 23 that engage the slots 7 of the container 16. The hinge slots 23, as shown, engage the slots 7 of the container 16 such that a cavity 24 is formed between the hinge slots 23 and the front container wall 19. The cavity 24 permits the spout 10 to be rotated between the closed position (FIG. 6A) and the open position (FIG. 6B). The cavity 24 also permits the spout 10 to be rotated without deflecting or deforming the front container wall 19.

Referring now to FIG. 7, another alternative embodiment of the hinge mechanism 18 is illustrated. In this embodiment, the hinge mechanism 18 includes cylindrical projections or nobs 14 which extend perpendicularly from the side walls 3a and 3b and are positioned adjacent to the open end of the spout opening 4. The nobs 14 engage receiving holes 15 which are formed on a edge surfaces 37 of container wall 19. As discussed above, the front panel 1 must be in the same plane as the axis of rotation to ensure that the front panel mates against the gate 5 and seals opening 6 of container 16 (not shown in FIG. 7). This embodiment of the hinge mechanism 18 is preferably used when the spout 10 is installed in a reusable container made from a rigid material such as plastic.

Figure 8:
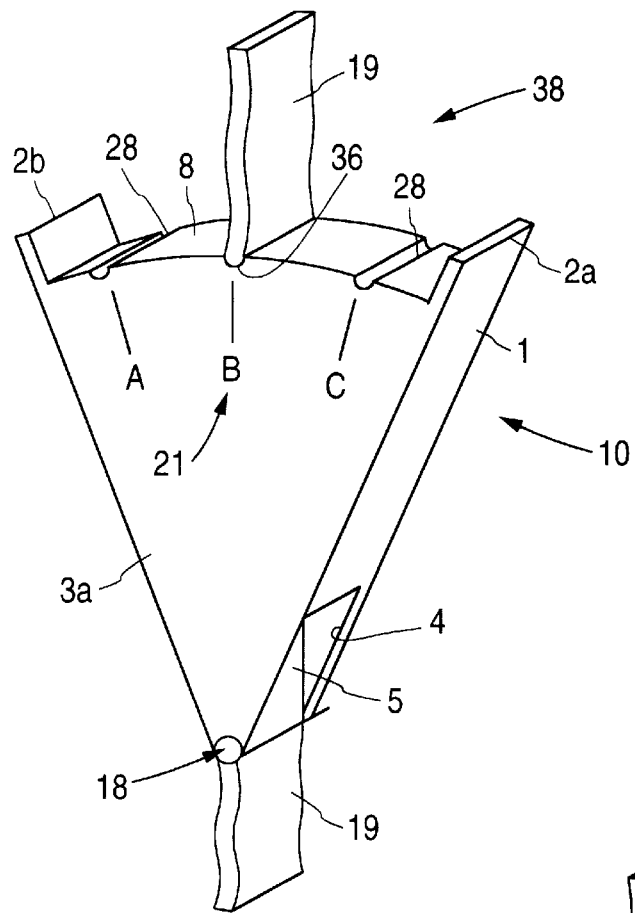
FIG. 8 is a perspective view of one embodiment of a measurement mechanism used on the spout of the present invention.

Referring now to FIG. 8, a measurement mechanism 38 for the spout of the present invention is illustrated. The measurement mechanism 38 may be used together with or in place of the graduated markings 21. The measurement mechanism 38 includes a plurality of notches 28 positioned along the arcuate top wall 8 of the spout 10 and between the front and rear stop members 2a and 2b. The notches 28 are preferably positioned at an angle of opening that forms a predetermined cavity size within the spout 10. As shown, the notches 28 may also align with corresponding graduated markings 21. Each notch 28 is preferably slightly wider than the thickness of the upper edge 36 of the container opening 6. This sizing permits the upper edge 6 to fit within a selected notch 28.

In operation, a user selects a desired particulate material measurement and slidably rotates the spout 10 until the corresponding notch 28 engages the upper edge 36 of the container opening 6 provided in the container wall 19. For example, if the user desires to dispense enough detergent to clean a small load of laundry, then the user rotates the spout 10 until the notch 28 corresponding to the graduated marking "C" engages the upper edge 36 of the opening 6. Alternatively, if the user desires to dispense enough detergent to clean a medium load of laundry, then the user rotates the spout 10 until the notch 28 corresponding to the graduated marking "B" engages the upper edge 36 of the opening 6. Finally, if the user desires to dispense enough detergent to clean a large load of laundry, then the user rotates the spout 10 until the notch 28 corresponding to the graduated marking "A" engages the upper edge 36 of the opening 6. Afterwards, the user dispenses the selected amount of detergent in accordance with the dispensing method discussed in the description of FIG. 3.

Figure 9:
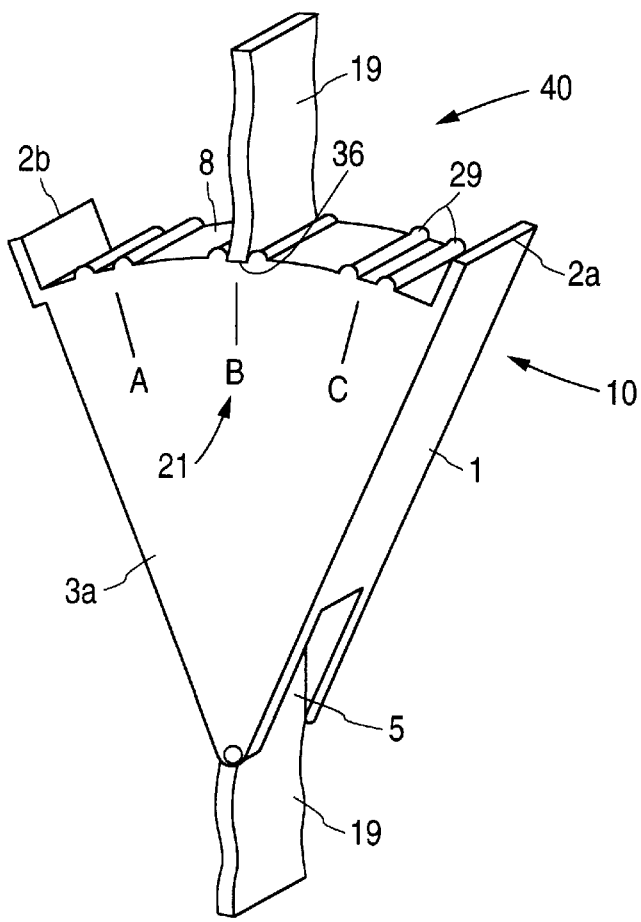
FIG. 9 is a perspective view of another embodiment of a measurement mechanism used on the spout of the present invention.

Referring now to FIG. 9, an alternative measurement mechanism 40 is illustrated. As with the measurement mechanism 38 shown in FIG. 8, the measurement mechanism 40 may be used together with or in place of the graduated markings 21. The measurement mechanism 40 includes a plurality of registration bumps or projections 29 positioned along the arcuate top wall 8 of the spout 10 and between the front and rear stop members 2a and 2b. Pairs of the bumps 29 are preferably positioned at an angle of opening that forms a predetermined cavity size within the spout 10. As shown, each pair of bumps may also be positioned on either side of a corresponding graduated marking 21. Each pair of bumps 29 is preferably spaced apart slightly farther than the thickness of the upper edge 36 of the container opening 6. This spacing permits the upper edge 6 to fit within a selected pair of bumps 29.

In operation, a user selects a desired particulate material measurement and slidably rotates the spout 10 until the upper edge 36 of the container opening 6 engages a selected pair of bumps 29. For example, if the user desires to dispense enough detergent to clean a small load of laundry, then the user rotates the spout 10 until the upper edge 36 of the opening 6 engages the bumps 29 positioned on either side of the graduated marking "C". Alternatively, if the user desires to dispense enough detergent to clean a medium load of laundry, then the user rotates the spout 10 until the upper edge 36 of the opening 6 engages the bumps 29 positioned on either side of the graduated marking "B". Finally, if the user desires to dispense enough detergent to clean a large load of laundry, then the user rotates the spout 10 until the upper edge 36 of the opening 6 engages the bumps 29 positioned on either side of the graduated marking "A". Afterwards, the user dispenses the selected amount of detergent in accordance with the dispensing method discussed in the description of FIG. 3.

Figure 10:
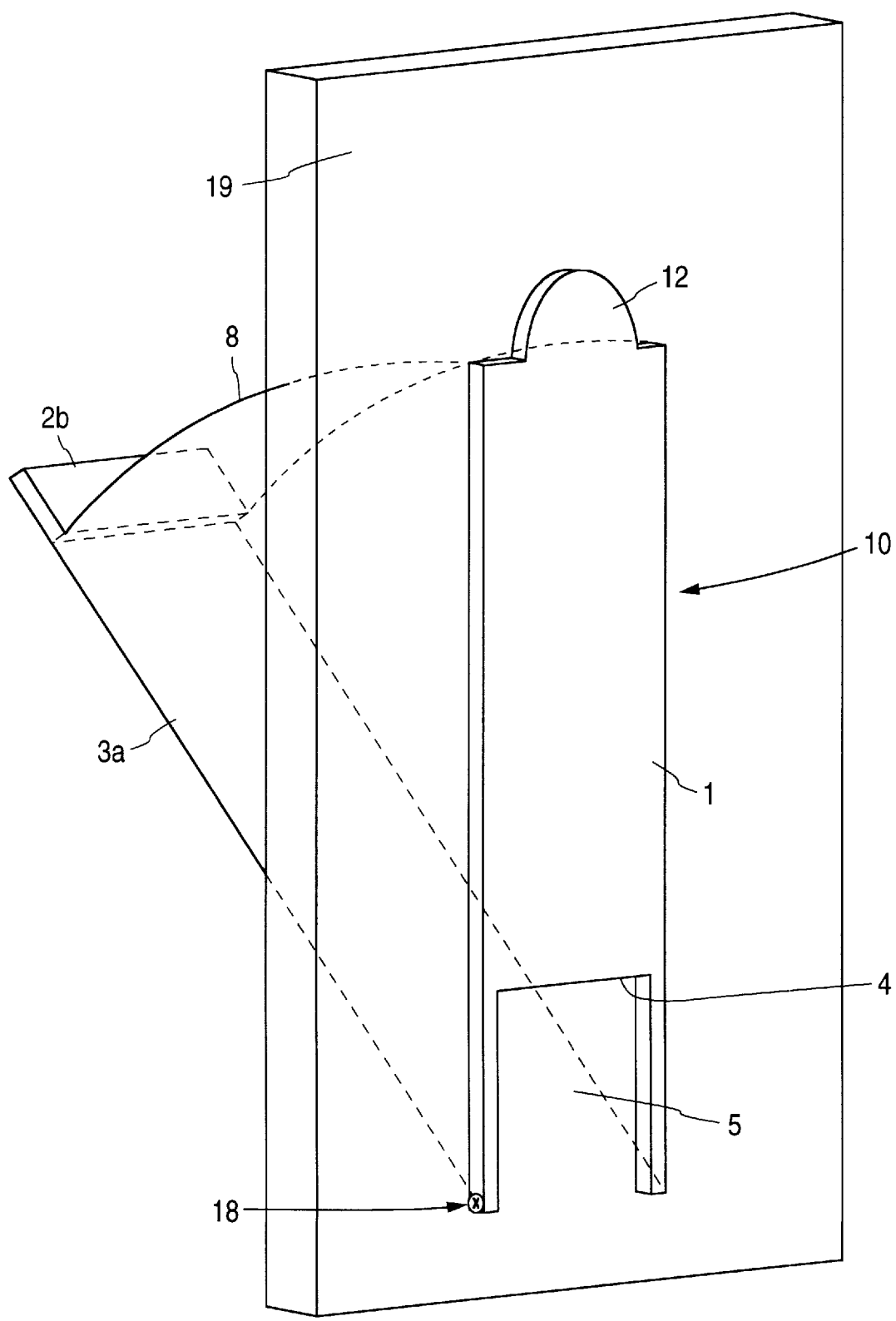
FIG. 10 is a perspective view of an alternative embodiment of the spout of the present invention where a tab is used for opening and closing the spout.

Referring now to FIG. 10, in an alternative embodiment of the spout 10, a pull tab 12 may be used in lieu of the first stop member 2a (not shown in FIG. 10). One benefit obtained by using the pull tab 12 is that less material is required for the fabrication of the pull tab 12 than for the fabrication of front stop member 2a. Another benefit obtained by using pull tab 12 is that the tab 12 provides a convenient area on the spout 10 for a user to manipulate when the user is opening and closing the spout 10.

Figure 11A:
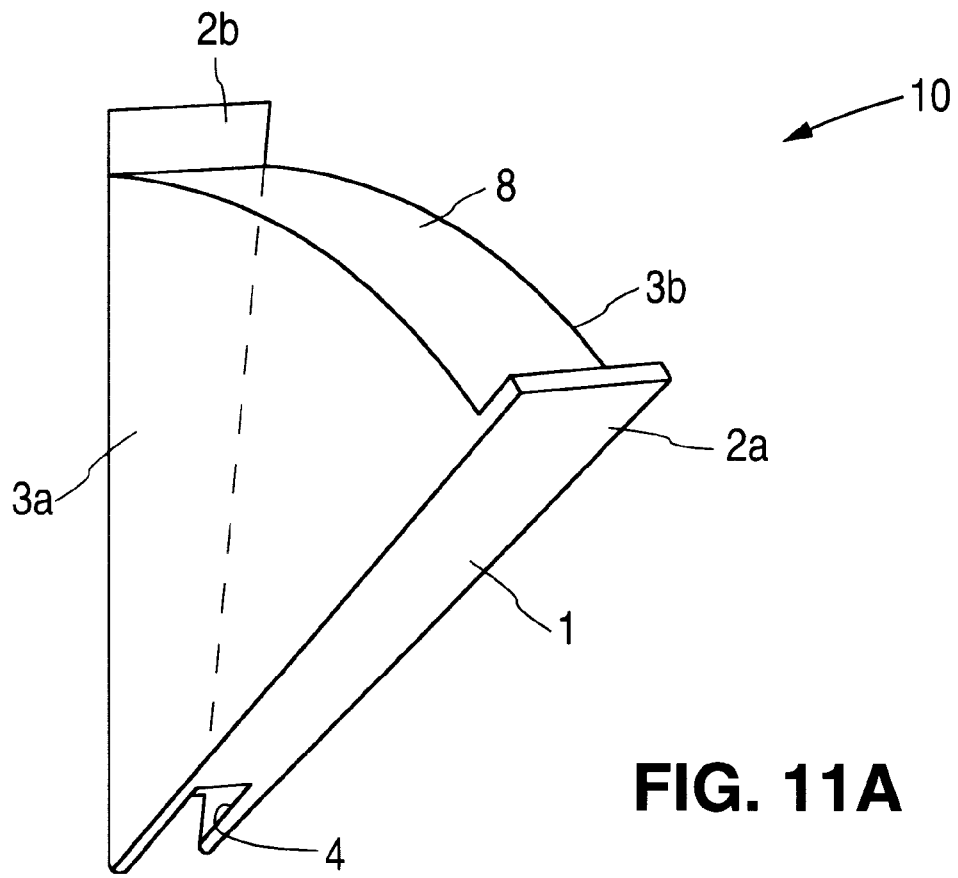
FIG. 11A is a perspective view of another alternative embodiment of the spout of the present invention where the front wall of the spout is tapered.
Figure 11B:
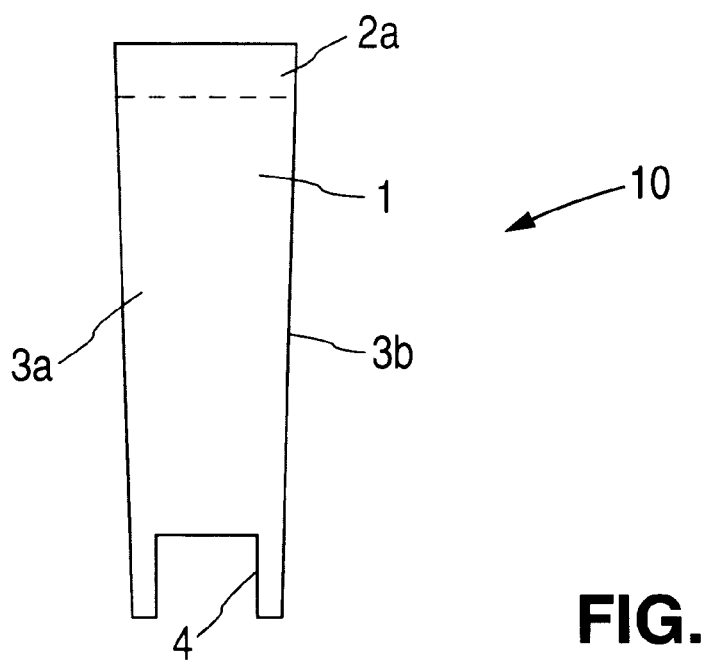
FIG. 11B is a front elevational view of the spout of FIG. 10A.

Referring now to FIGS. 11A and 11B, in an alternative embodiment of the spout 10, the front wall 1 may be tapered such that the side walls 3a and 3b are angled towards one another. Although the front wall 1 is shown as being tapered such that the wall 1 is wider at the front tab 2a than at the opening 4, it is considered within the scope of the invention to taper the front wall 1 such that the wall 1 is wider at the opening 4 than at the front tab 2a. Tapering the front wall 1 results in a number of benefits. First, the tapered wall 1 and slanted sides 3a and 3b facilitate stacking of the spouts prior to assembly. Second, the tapered wall 1 and slanted sides 3a and 3b facilitate a sorting process that the spouts undergo during their attachment to the particulate matter containers.

Figure 12A:
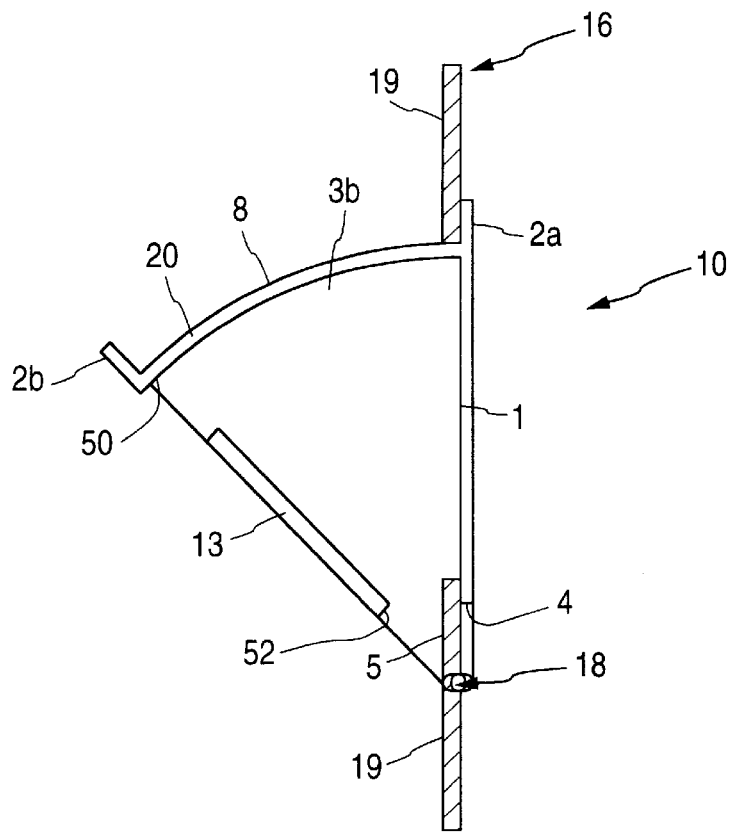
FIGS. 12A and 12B are side elevational views, partially is section, of another alternative embodiment of the spout of the present invention where the spout dispenses a fixed amount of particulate material.
Figure 12B:
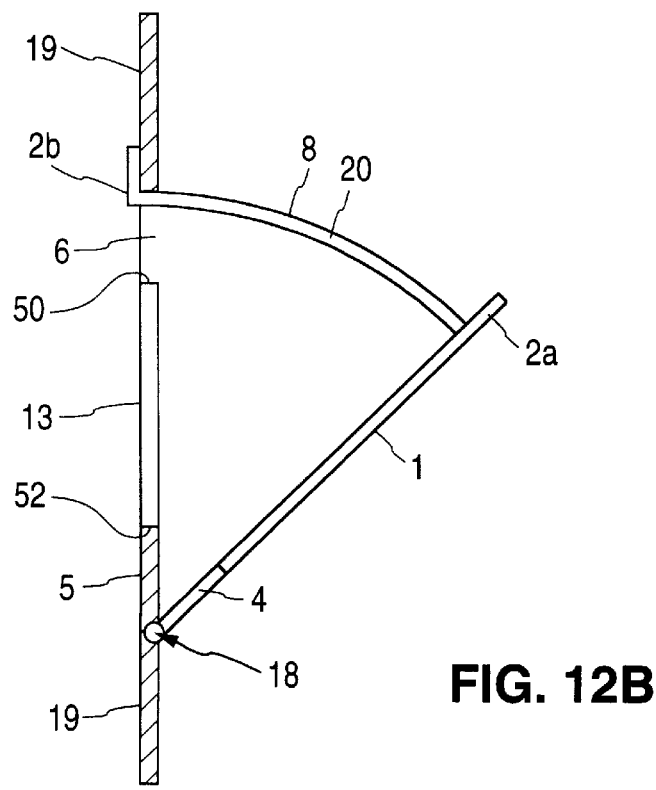

Referring now to FIGS. 12A and 12B, another alternative embodiment of the measuring pour spout 10 and particulate material container 16 is illustrated. In this embodiment the spout 10 is designed to measure and dispense a fixed amount of particulate material. The container 16 has a shortened cantilever gate 5 (compare with the gate shown in FIG. 1). As described before, the spout 10 includes two generally triangular side walls 3a and 3b having arcuate top edges 20, a front wall 1 having an opening 4 extending therethrough, and an arcuate top wall 8 extending between the arcuate edges 20 of side walls 3a and 3b. A front stop tab 2a and a rear stop tab 2b extend upwardly from opposing edges of the arcuate top wall 8. However, the alternative embodiment of the spout 10 also includes a rear wall 13 which is positioned between the rear stop member 2b and the hinge mechanism 18. A first aperture 50 extends through the rear wall 13 adjacent the rear stop member 2a and a second aperture 52 which extends through the rear wall 13 adjacent the hinge mechanism 18.

The spout 10 is connected to the container 16 via the hinge mechanism 18 in a manner similar to that described above. However, the shortened gate 5 is at least long enough to abut or overlap the front wall 1, when the spout 10 is in the closed position (FIG. 12A), and rear wall 13, when the spout 10 is in the fully opened position (FIG. 12B). In other words, gate 5 seals the opening 4, when the spout 10 is in the closed position, and the second aperture 52, when the spout is in the fully opened position. In an alternative embodiment (not shown), rear wall 13 may be removed from the spout 10. In this case, the gate 5 would only be long enough to overlap the front wall 1 when the spout 10 is in the closed position.

In operation, a user slidably opens spout 10 from the closed position (FIG. 12A) to the fully open position (FIG. 12B) by pulling front stop member 2a. It should be noted that the user fully opens the spout 10 to ensure that the correct amount of particulate material fills the spout 10. This arrangement reduces the amount of pressure that passing particulate material exerts on the gate 5 since the overall surface area of gate 5 is reduced.

Figure 13:
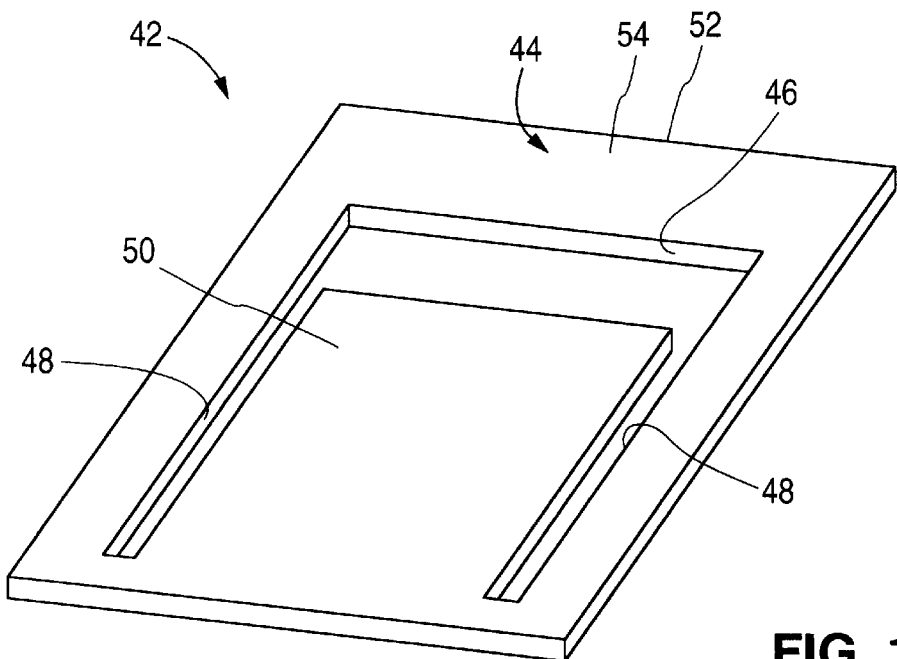
FIG. 13 is a perspective view of an embodiment of a support frame for use with the spout of the present invention.

Referring now to FIG. 13, in conjunction with FIG. 1, the pour spout 10 of the present invention may be mounted on the container 16 via a support frame 42. The support frame 42 is sized to be fitted within an opening (not shown) formed in the front wall 19 of the container 16. The frame 42 is fitted within the opening of the front wall 19 through any conventional means known by those skilled in the art, such as by an adhesive paste or clamping mechanism. The support frame 42 permits the spout 10 to be connected to front wall 19 such that the front wall 19 is not deformed or weakened as the spout moves between the opened and closed positions or as the particulate material is collected and dispensed by the spout 10.

The frame 42 may be fabricated from a rigid material such as plastic. Generally, the frame 42 has a rectangular shape and includes a front face 44 having an opening 46 and a pair of open-ended slots 48 extending therethrough. A portion of the front face 44 may form a cantilevered barrier gate 50 positioned between the slots 48 and below the opening 46. The spout 10 is fitted to the barrier gate 50 of the frame 42, as discussed in detail below. Alternatively, the front face may lack a barrier gate and the spout may be mounted to the frame 42 and fitted to the barrier gate 5 of the front wall 19 of the container 16, as discussed in detail in the description of FIG. 1 and FIGS. 2A–2C.

Figure 14:
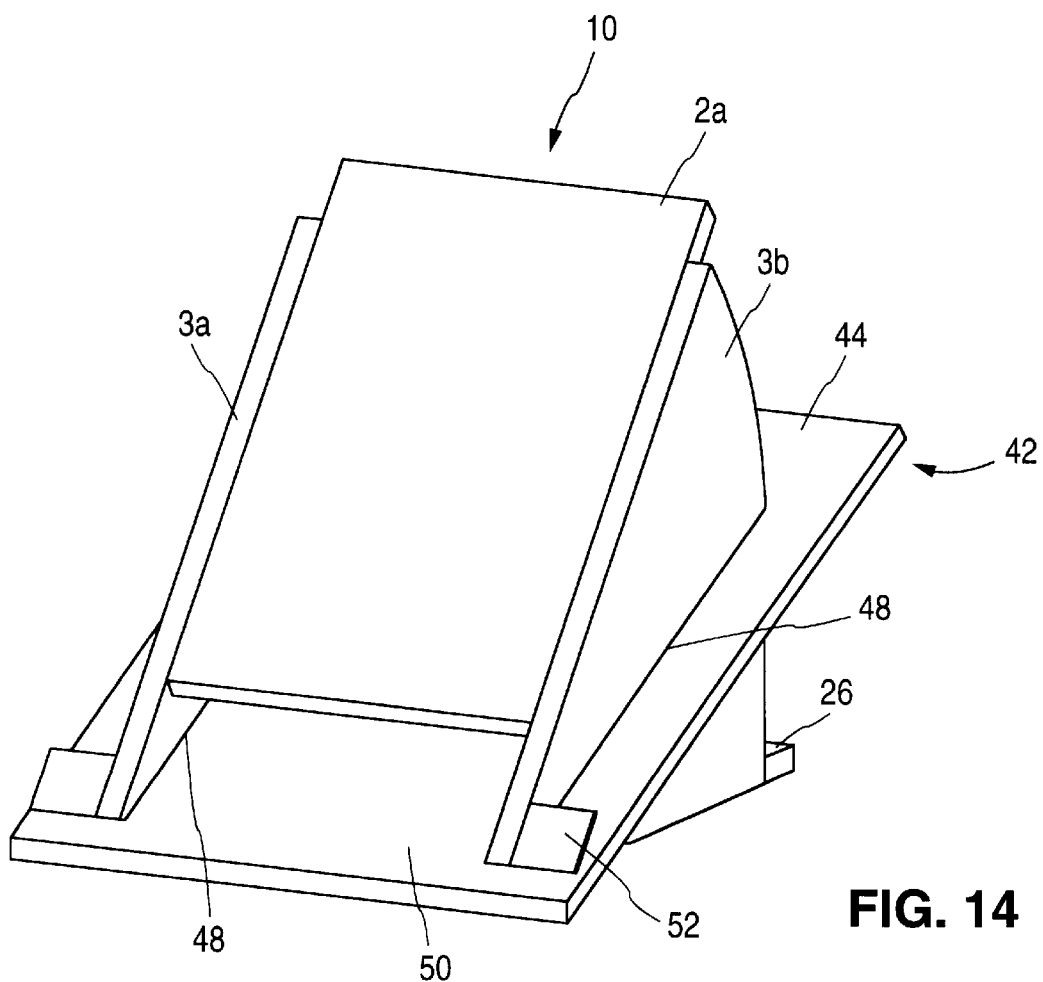
FIG. 14 is a perspective view of the spout of the present invention engaged with the support frame of FIG. 13.

Referring now to FIG. 14, together with FIG. 13, the spout 10 is connected to the frame 42 via a conventional hinge mechanism 52, e.g. hinge tabs, such that the side walls 3a and 3b of the spout 10 are positioned within the slots 48 on either side of the barrier gate 50 of the frame 42. It should be noted that the slots 48 are preferably wide enough to permit the side wall 3a and 3b to slide therethrough but narrow enough to prohibit any particulate material from passing therethrough. The hinge mechanism 52 supports the spout 10 on the frame 42 which, in turn, supports the spout 10 on the container 16 such that the rear stop member 2b of the spout 10 is positioned inside the container 16 (left side of FIGS. 2A–2C) and the front stop member 2a is positioned on the outside of the container 16 (right side of FIGS. 2A–2C). With this arrangement, the rear stop member 2b engages an rear portion 52 of the frame 42 when the spout 10 is in the fully opened position, thereby, limiting the forward travel of the spout 10. Similarly, the front stop member 2a engages an front portion 54 of the frame 54 when the spout 10 is in the fully closed positioned, thereby, sealing the container 16 and isolating the particulate material within the container 16 from the surrounding environment. A cavity (not shown) is formed between the spout 10 and the barrier gate 50 of the frame 42 as the spout 10 is moved between the closed and opened positions. This cavity is similar to the cavity 17 discussed in the description of FIGS. 2A–2C.

Figure 15:
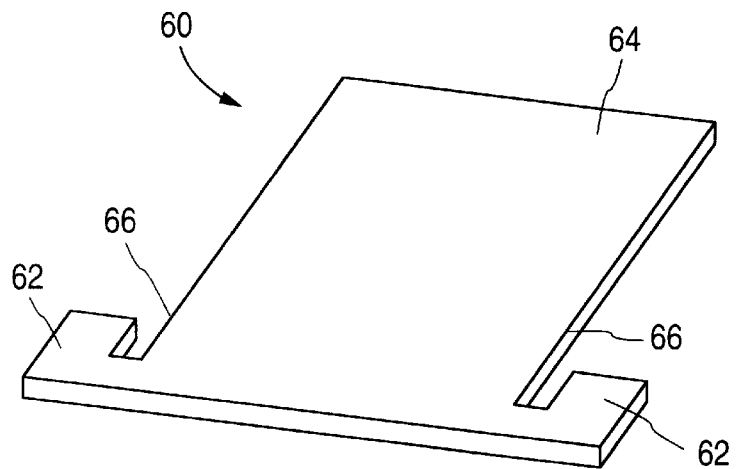
FIG. 15 is a perspective view of another embodiment of a support frame for use with the spout of the present invention.

Referring now to FIG. 15, in conjunction with FIG. 1, the pour spout 10 of the present invention may be mounted on the container 16 via an alternative support frame 60. The support frame 60 is sized to be fitted within an opening (not shown) formed in the front wall 19 of the container 16. The frame 60 is fitted within the opening of the front wall 19 through any conventional means known by those skilled in the art, such as by an adhesive paste or clamping mechanism. The support frame 60 permits the spout 10 to be connected to front wall 19 such that the front wall 19 is not deformed or weakened as the spout moves between the opened and closed positions or as the particulate material is collected and dispensed by the spout 10.

The frame 60 may be fabricated from a rigid material such as plastic. Generally, the frame 60 is T-shaped and includes support projections 62, a cantilevered barrier gate 64, and slots 66 between the support projections 62 and the barrier gate 64. The spout 10 is fitted to the barrier gate 64 of the frame 60, as discussed in detail below. Alternatively, the frame 60 may lack a barrier gate and the spout may be mounted to the frame 60 and fitted to the barrier gate 5 of the front wall 19 of the container 16, as discussed in detail in the description of FIG. 1 and FIGS. 2A–2C.

Figure 16:
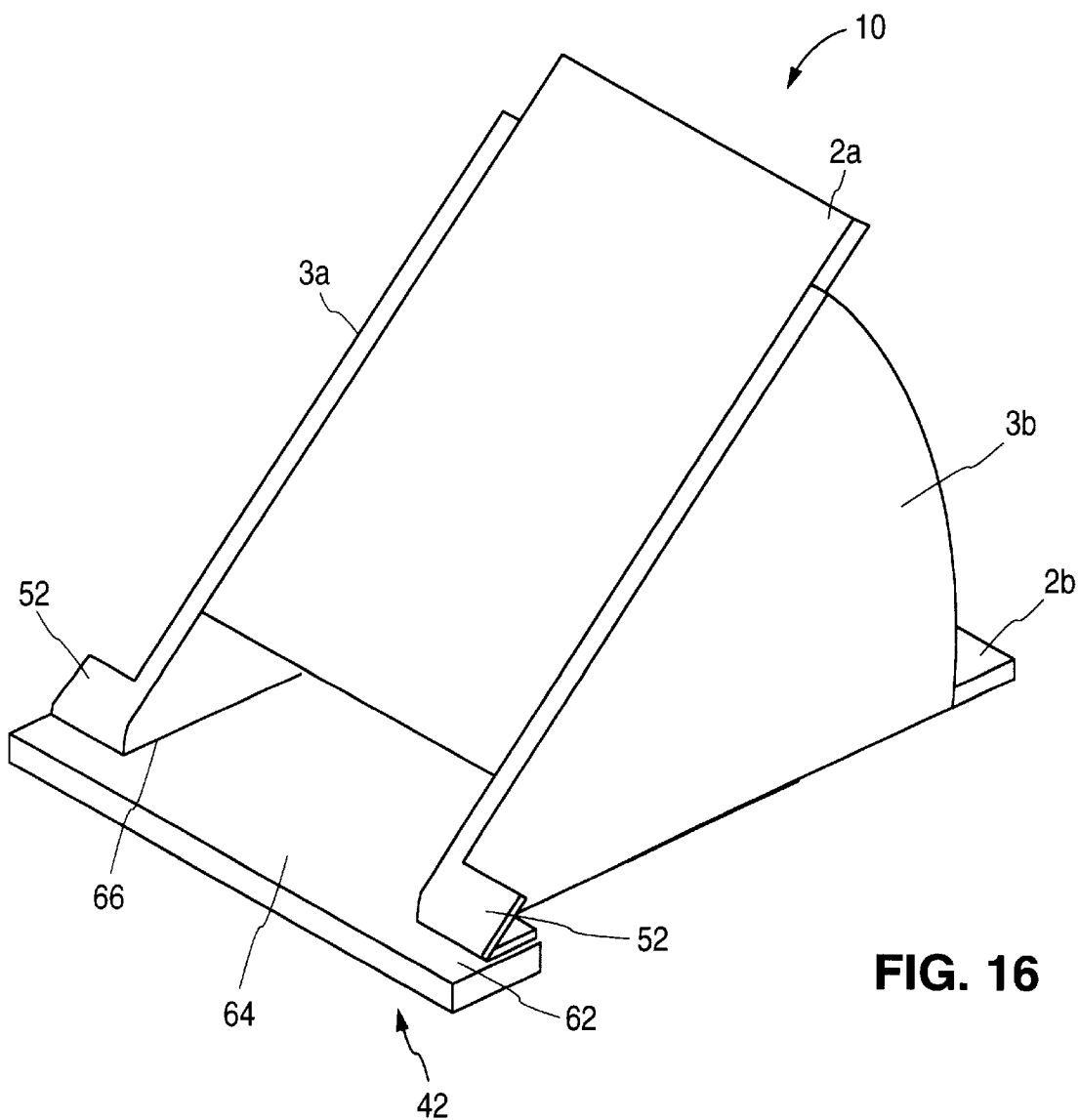
FIG. 16 is a perspective view of the spout of the present invention engaged with the support frame of FIG. 15.

Referring now to FIG. 16, together with FIG. 15, the spout 10 is connected to support projections 62 of the frame 60 via a conventional hinge mechanism 52, e.g. hinge tabs, such that the side walls 3a and 3b of the spout 10 are positioned within the slots 66 on either side of the barrier gate 64 of the frame 60. It should be noted that the slots 66 are preferably wide enough to permit the side wall 3a and 3b to slide therethrough but narrow enough to prohibit any particulate material from passing therethrough. The hinge mechanism 52 supports the spout 10 on the frame 60 which, in turn, supports the spout 10 on the container 16 such that the rear stop member 2b of the spout 10 is positioned inside the container 16 (left side of FIGS. 2A–2C) and the front stop member 2a is positioned on the outside of the container 16 (right side of FIGS. 2A–2C). With this arrangement, the rear stop member 2b engages an inner portion of the front wall 19 when the spout 10 is in the fully opened position, thereby, limiting the forward travel of the spout 10, as shown in FIG. 2C. Similarly, as shown in FIG. 2A, the front stop member 2a engages an outer portion of the front wall 19 when the spout 10 is in the fully closed positioned, thereby, sealing the container 16 and isolating the particulate material within the container 16 from the surrounding environment. A cavity (not shown) is formed between the spout 10 and the barrier gate 50 of the frame 42 as the spout 10 is moved between the closed and opened positions. This cavity is similar to the cavity 17 discussed in the description of FIGS. 2A–2C.

Thus, the pour spout of the present invention provides a measuring and pouring device that is simple in design, inexpensive to manufacture, and more efficient to operate than conventional measuring dispensers.

While the present invention has been described with reference to preferred embodiments, it is apparent that various changes may be made in the embodiments without departing from the spirit and scope of the invention, as defined by the appended claims.

For example, hinge mechanisms, other than those described above, may be used depending on whether the containers to which they are attached are designed for a disposable or permanent application. One example of an alternative hinge mechanism includes ridged tabs extending out on the same plane as the top panel at the hinge points. Tabs could be attached to the box with a flexible member such as glued cardboard or a flexible plastic. Additionally, measurement detents, other than those described above, may be incorporated into the spouts design. Moreover, the shape of the spout opening could be different. In particular, the spout opening may have an arc or square shape.

What is claimed is:

1. A measuring pour spout assembly comprising:

a container for holding a quantity of particulate material, said container including a first wall having an opening therethrough;

a measuring pour spout having a top wall, a pair of side walls, and a front wall having an aperture extending therethrough, said top, side and front walls forming a chamber therebetween for collecting a quantity of particulate material dispensed from said opening of said container, said aperture for dispensing said collected quantity of particulate material from said chamber; and a mounting mechanism pivotally connecting said measuring pour spout in said opening of said first wall such that a volume of said chamber varies as said front wall of said spout is moved relative to said first wall of said container.

2. The measuring pour spout assembly of claim 1 including an indicator means for providing an indication of the volume of the spout.

3. The measuring pour spout assembly of claim 2, wherein said indicator means includes an indicia on said spout.

4. The measuring pour spout assembly of claim 2, wherein said indicator means includes a plurality of recesses on said spout for engaging a portion of said first wall.

5. The measuring pour spout assembly of claim 2, wherein said indicator means includes a plurality of paired projections on said spout, each pair of projections for engaging a portion of said first wall therebetween.

6. The measuring pour spout assembly of claim 1, wherein said spout is transparent.

7. The measuring pour spout assembly of claim 1, wherein said spout is translucent.

8. The measuring pour spout assembly of claim 1, wherein said mounting mechanism includes:

a pair of knobs extending from said sidewalls of said spout, and a pair of recesses formed in said first wall of said container for engaging said pair of knobs.

9. The measuring pour spout assembly of claim 1, wherein said spout includes stop members for limiting the movement of said front wall of said spout with relative to said first wall of said container.

10. The measuring pour spout assembly of claim 1, wherein an upper edge of said front wall of said spout is of a greater dimension than a lower edge of said front wall such that said side walls of said spout are angled towards one another.

11. The measuring pour spout assembly of claim 1, wherein a lower edge of said front wall of said spout is of a greater dimension than an upper edge of said front wall such that said side walls of said spout are angled towards one another.

12. The measuring pour spout assembly of claim 1, wherein said spout is mounted in said opening of said container such that said chamber of spout collects a quantity of particulate material dispensed through said opening when said container is tipped from an upright position and said aperture of said spout dispenses said collected quantity of particulate material when said container is returned to said upright position.

13. The measuring pour spout assembly of claim 1 including a support frame connecting said mounting mechanism to said first wall of said container.

14. The measuring pour spout assembly of claim 1 including a support frame connecting said mounting mechanism to said first wall of said container.

15. A measuring pour spout assembly comprising:

a container for holding a quantity of particulate material, said container including a first wall having an opening and a pair of slots positioned below said opening, said opening and slots defining a cantilevered gate member;

a measuring pour spout having a top wall, a pair of side walls, and a front wall having an aperture extending therethrough, said top, side and front walls forming a chamber therebetween for collecting a quantity of particulate material dispensed through said opening of said container, said aperture for dispensing said collected quantity of particulate material from said chamber; and a mounting mechanism pivotally connecting said measuring pour spout to said first wall such that said side walls of said spout slidably engage said grooves in said first wall, said chamber of said spout collects particulate material dispensed through said opening of said first wall, and a volume of said chamber varies as said front wall of said spout is moved relative to said cantilevered gate member.

16. The measuring pour spout assembly of claim 15 including an indicator means for providing an indication of said volume of said spout.

17. The measuring pour spout assembly of claim 16, wherein said indicator means includes an indicia on said spout.

18. The measuring pour spout assembly of claim 16, wherein said indicator means includes a plurality of recesses on said spout for engaging a portion of said first wall.

19. The measuring pour spout assembly of claim 16, wherein said indicator means includes a plurality of paired projections on said spout, each pair of projections for engaging a portion of said first wall therebetween.

20. The measuring pour spout assembly of claim 15, wherein said spout is transparent.

21. The measuring pour spout assembly of claim 15, wherein said spout is translucent.

22. The measuring pour spout assembly of claim 15, wherein said mounting mechanism includes:

a pair of knobs extending from said sidewalls of said spout, and a pair of recesses formed in said first wall of said container for engaging said pair of knobs.

23. The measuring pour spout assembly of claim 15, wherein said spout includes stop members for limiting the movement of said front wall of said spout relative to said cantilevered gate member of said container.

24. The measuring pour spout assembly of claim 15, wherein an upper edge of said front wall of said spout is of a greater dimension than a lower edge of said front wall such that said side walls of said spout are angled towards one another.

25. The measuring pour spout assembly of claim 15, wherein a lower edge of said front wall of said spout is of a greater dimension than an upper edge of said front wall such that said side walls of said spout are angled towards one another.

26. The measuring pour spout assembly of claim 15, wherein said spout is mounted to said first wall of said container such that said chamber of said spout collects a quantity of particulate material dispensed through said opening when said container is tipped from an upright position and said aperture of said spout dispenses said collected quantity of particulate material when said container is returned to said upright position.

27. A measuring pour spout assembly comprising:

a container for holding a quantity of particulate material, said container including a first wall having an opening and a pair of slots positioned below said opening, said opening and slots defining a cantilevered gate member;

a measuring pour spout having a top wall, a pair of side walls, and a front wall having an aperture extending therethrough, said top, side and front walls forming a chamber therebetween for collecting a quantity of particulate material dispensed through said opening of said container, said aperture for dispensing said collected quantity of particulate material from said chamber; and a mounting mechanism pivotally connecting said measuring pour spout to said first wall such that said side walls of said spout slidably engage said grooves of said container, a volume of said chamber varies when said front wall of said spout is moved relative to said cantilevered gate member, said chamber of said spout collects a measured quantity of particulate material dispensed through said opening of said container when said container is tipped from an upright position, and said aperture of said spout dispenses said measured quantity of particulate material when said container is returned to said upright position.

* * * * *